United States Patent
Blanke

(10) Patent No.: US 8,499,359 B1
(45) Date of Patent: Jul. 30, 2013

(54) DATA LOSS PREVENTION USING AN EPHEMERAL KEY

(75) Inventor: William Blanke, White Salmon, WA (US)

(73) Assignee: Symantec Corporation, Mountain View, CA (US)

( * ) Notice: Subject to any disclaimer, the term of this patent is extended or adjusted under 35 U.S.C. 154(b) by 297 days.

(21) Appl. No.: 12/967,411

(22) Filed: Dec. 14, 2010

(51) Int. Cl.
*G06F 21/00* (2013.01)

(52) U.S. Cl.
USPC ............................................. 726/32; 705/57

(58) Field of Classification Search
USPC .................... 726/32; 380/281, 284; 705/57
See application file for complete search history.

(56) References Cited

U.S. PATENT DOCUMENTS

| | | | | |
|---|---|---|---|---|
| 5,677,952 A | * | 10/1997 | Blakley et al. | 713/189 |
| 7,814,318 B1 | * | 10/2010 | Perlman et al. | 713/165 |
| 2009/0097662 A1 | * | 4/2009 | Olechowski et al. | 380/286 |

OTHER PUBLICATIONS

Datardina, Malik. "Information Leakage & Data Loss Prevention." Jul. 5, 2009, ACC 626—Assurance of Corporate Governance, Oakland University.*
Blaze, M., "A Cryptographic File System for Unix", Proceedings of the 1st ACM Conference on Computer and Communications Security, Nov. 1993, 8 pages.
Clarke, C.L.A. et al., "On the use of regular expressions for searching text", ACM Transactions on Programming Languages and Systems vol. 19, pp. 413-426, 1997.
Gutmann, P., "Secure Deletion of Data from Magnetic and Solid-State Memory", Proceedings of the 6th Conference on USENIX Security Symposium, 1996, 18 pages.
Hughes, G.F. et al., "Disposal of Disk and Tape Data by Secure Sanitization", IEEE Security and Privacy, Jul./Aug. 2009, pp. 29-34, vol. 7, No. 4.
Joukov, N. et al., "Adding Secure Deletion to Your Favorite File System", 3rd IEEE International Security in Storage Workshop, pp. 63-70, 2005.
Kissel, R. et al., "Guidelines for Media Sanitization", NIST Special Publication 800-88, Sep. 2006, 43 pages.
Liu, S. et al., "Data Loss Prevention", IT Professional vol. 12, No. 2, pp. 10-13, 2010.
Shraer, A. et al., "Venus: Verification for Untrusted Cloud Storage", Proceedings of the 2010 ACM Cloud Computing Security Workshop, pp. 19-30, 2010.
Wright, C.P. et al., "Cryptographic File Systems Performance: What You Don't Know Can Hurt You", Proceedings of the 2nd IEEE International Security in Storage Workshop, pp. 47-61, 2003.
Zertal, S. et al., "Investigating Flash Memory Wear Levelling and Execution Modes", International Symposium on Performance Evaluation of Computer Telecommunication Systems, vol. 41, pp. 81-88, 2009.

\* cited by examiner

*Primary Examiner* — Kambiz Zand
*Assistant Examiner* — Michael Guirguis
(74) *Attorney, Agent, or Firm* — Fenwick & West LLP

(57) ABSTRACT

A user requests to store a file to a storage device and a DLP module receives the request. The DLP module receives data for the file, encrypts the data using an encryption key and stores the encrypted data to the storage device. Next, the DLP module determines whether the encrypted data in the file is in compliance with a DLP policy. To determine compliance, the DLP module decrypts the data using the encryption key and examines the decrypted data for compliance. If the decrypted data is not in compliance with the DLP policy, the DLP module deletes the encrypted data from the storage device.

20 Claims, 5 Drawing Sheets

DATA LOSS PREVENTION USING AN EPHEMERAL KEY

BACKGROUND

1. Field of Disclosure

The disclosure generally relates to the field of encryption, in particular to using encryption to prevent data loss from an enterprise.

2. Description of the Related Art

Enterprises such as businesses often use document repositories to enable users to collaborate and share files. Unfortunately, unprotected files can pose a critical risk to an enterprise's most sensitive data like customer information, financial data, trade secrets, and other proprietary information. Exposure of these data can result in financial loss, legal ramifications, and brand damage.

Data Loss Prevention ("DLP") systems identify, monitor, and protect data in order to prevent sensitive data from leaving an enterprise. Typically, a DLP system will examine data that can potentially leave the enterprise, such as data being written to a removable storage device, to ensure that the data complies with a DLP policy. The DLP system prevents non-compliant data from leaving the enterprise by, e.g., blocking the data from being written to the removable storage device.

A difficulty with DLP systems is that the data often must be written to a storage device before it can be examined for compliance, yet the policy may specify that non-compliant data cannot be written to a storage device. The compliance policy might be structured this way because data can persist on a storage device even after it is deleted. Therefore, simply writing the data to a storage device, examining the data for compliance, and then deleting non-compliant data from the storage device may not prevent data loss from the enterprise.

SUMMARY

The above-described and other issues are addressed by a computer-implemented method, computer-readable medium, and computer system for writing an encrypted document to a storage device. Embodiments of the method comprise encrypting data written to a file of a storage device using an encryption key, decrypting the encrypted data using the encryption key to produce decrypted data, examining the decrypted data for compliance with the DLP policy, and deleting the encrypted data written to the file of the storage device responsive at least in part to the decrypted data not being in compliance with the DLP policy.

Embodiments of the computer-readable medium store executable computer-program instructions for encrypting data written to a file of a storage device using an encryption key, decrypting the encrypted data using the encryption key to produce decrypted data, examining the decrypted data for compliance with the DLP policy, and deleting the encrypted data written to the file of the storage device responsive at least in part to the decrypted data not being in compliance with the DLP policy.

Embodiments of the computer system comprise the above described computer-readable medium that stores instructions for writing an encrypted document to a storage device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

DETAILED DESCRIPTION

Figure 1:
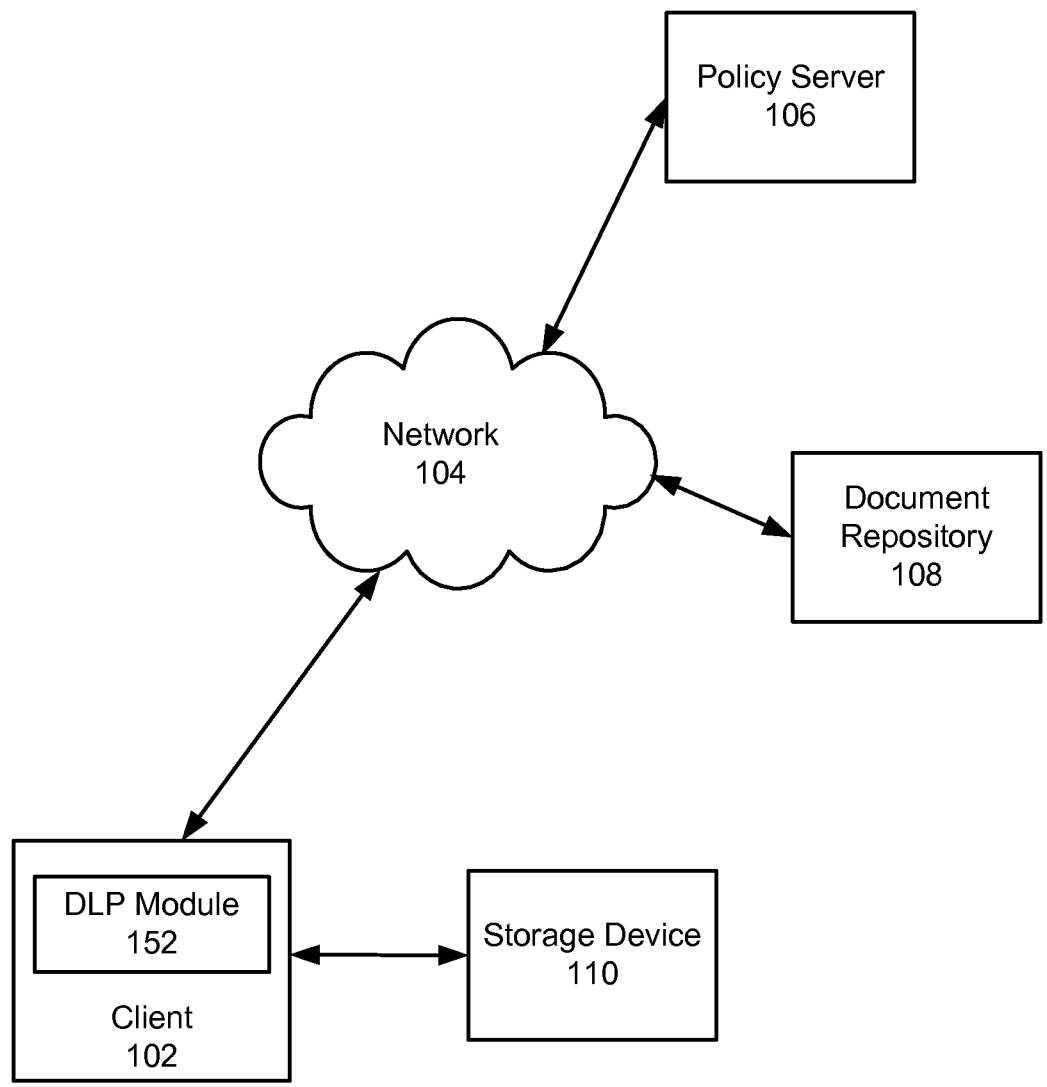
FIG. 1 is a block diagram illustrating a computing environment including a DLP module for data encryption according to one embodiment of the present disclosure.

FIG. 1 illustrates a computing environment that uses an ephemeral key to prevent data loss from an enterprise, according to one embodiment. The computing environment includes a policy server 106, a document repository 108, a network 104, a client 102, and a storage device 110.

The document repository 108 stores documents for an enterprise. The enterprise can be, for example, a business, government agency, educational institution, or other organization. Examples of documents include word processing files, spreadsheets, images, or other forms of electronic data. All or some of the data in the documents may be considered "sensitive" to the enterprise in the sense that the enterprise will be harmed if the data leaves the enterprise. For example, the data can include employee information such as government-issued identification numbers, customer records such as credit card numbers or medical information, and proprietary information such as trade secrets to the enterprise.

The policy server 106 stores one or more policies describing treatment of the documents in the document repository 108. These policies include a data loss prevention ("DLP") policy that describes types of data that can and cannot leave the enterprise. For example, the DLP policy may specify that non-sensitive data can leave the enterprise without restriction, but that sensitive data cannot leave the enterprise. For sensitive data, the policy can describe how to recognize the data, and specify fine-grained controls on what actions can be performed with the data. Thus, if the sensitive data include credit card numbers, the DLP policy can describe how to recognize the credit card numbers in unstructured data (e.g., specify a regular expression that can be used to detect credit card numbers in text files), the types of storage devices to which the data can be written (e.g., the data cannot be written to portable storage devices), and/or whether the data must be encrypted.

The client 102 is an electronic device such as a desktop computer, notebook computer, mobile telephone, or personal digital assistant and is used by a user to access documents stored in the document repository 108. The user can use the client 102 to, e.g., access documents that are already stored in the repository 108, edit the documents, and/or create new documents and then store the edited or new documents in the repository 108. The client 102 includes a DLP module 152 that implement the DLP policy specified by the policy server 106 to prevent the client from being used for enterprise data loss. The DLP module 152 may also support additional DLP-related functionality, such as providing file system support for encryption. The DLP module 152 can be incorporated into the operating system of the client 102 and/or part of a separate product.

In FIG. 1, a storage device 110 is coupled to the client 102. In one embodiment, the storage device 110 is portable. For example, the storage device 110 can be a Universal Serial Bus ("USB") flash drive, a portable hard drive, mobile telephone, or other similar device. In other embodiments, the storage device 110 is not necessarily portable. For example, the storage device 110 can be a hard drive or solid state storage device within a desktop computer.

Assume for purposes of this description that the client 102 writing a file to the storage device 110 causes the DLP module 152 to review the file for compliance with the DLP policy. The client 102 can write the file to the storage device 110 when, for example, the user instructs the client 102 to retrieve a file from the document repository 108 and write that file to the storage device 110, or when the user uses the client to create a new file and write the new file directly to the storage device 110.

In this situation, the DLP module 152 intercepts the request to write the file to the storage device 110 and uses an encryption key to encrypt the file as it is written, so that only encrypted data are written to the storage device 110. Once the encrypted file is written to the storage device 110, the DLP module 152 uses an ephemeral key to encrypt the encryption key, stores the encrypted encryption key with the file, and maintains the ephemeral key in volatile memory of the client 102. The DLP module 152 uses the ephemeral and encryption keys to decrypt the file and examine the data contained therein for compliance with the DLP policy. If the data do not comply with the policy, the DLP module 152 deletes the file from the storage device 110. Since the file written to the storage device 110 was encrypted by an encryption key that was itself encrypted by the ephemeral key, and the ephemeral key is not written to the storage device 110, the data in the deleted file cannot be read even if the data persists in the storage device 110 after deletion. If the data in the file complies with the policy, the DLP module 152 can make the encryption key public, decrypt the file on the storage device, and/or perform other actions that make the data available. Thus, the DLP module 152 uses the ephemeral key, in combination with the encryption key, to examine the file data for compliance with the DLP policy without risking inadvertent loss of the data through persistence of deleted data on the storage device 110.

The network 104 represents the communication pathways between the client 102, the policy server 106 and the document repository 108. In one embodiment, the network 104 is an enterprise network maintained by the enterprise. In another embodiment, the network is, or contains links travelling over, the Internet.

Figure 2:
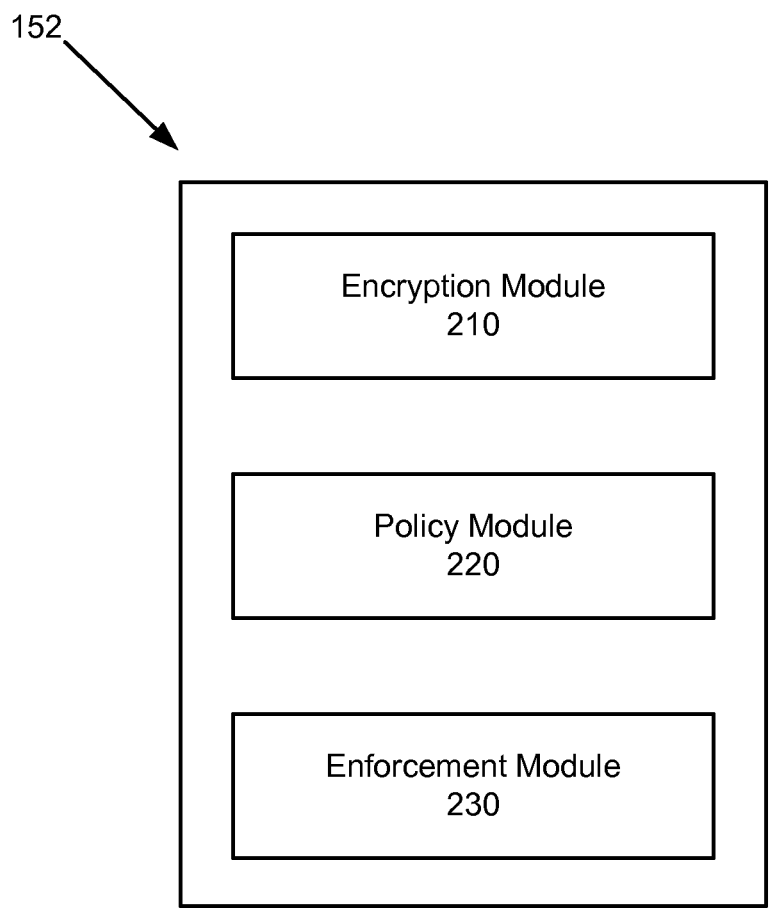
FIG. 2 is a block diagram illustrating the DLP module according to one embodiment of the present disclosure.

FIG. 2 is a block diagram illustrating the DLP module 152 according to one embodiment of the present disclosure. The DLP module 152 comprises an encryption module 210, a policy module 220, and an enforcement module 230. Other embodiments have different and/or additional modules, and distribute the functionality among the modules in different ways than described herein.

The encryption module 210 encrypts a file being written to the storage device 110 using cryptographic keys. In one embodiment, the encryption module 210 encrypts all files written to the storage device 110. For example, if the user of the client 102 uses the client to retrieve a document from the document repository 108 and write the document to a file on the storage device 110, the encryption module 210 encrypts the file as it is written so that only an encrypted version of the file is stored on the storage device. Similarly, if the user uses the client 102 to create a new document and save the document to a file on the storage device 110, the encryption module 210 encrypts the new file as it is written.

The encryption module 210 uses an encryption key to encrypt the data being written to the storage device 110. In one embodiment, the encryption module 210 uses a symmetric key to encrypt the data. Using a symmetric key, where the encryption and decryption keys are the same, is beneficial because symmetric encryption algorithms tend to be faster and more computationally efficient than asymmetric encryption algorithms. These qualities are useful if the documents being written to the storage device 110 are large because the document can be encrypted/decrypted more quickly than if an asymmetric key were used. Other embodiments of the encryption module 210 use an asymmetric encryption key. Using an asymmetric key is beneficial in some embodiments because such a key does not require a secure channel to transmit the key to the decrypting party.

In one embodiment, the encryption module 210 generates a unique ephemeral key and uses it to encrypt the encryption keys corresponding to various documents accessed by the user during a session. Accordingly, every document accessed and encrypted during the session is associated with its unique encryption key and the session ephemeral key. The ephemeral key exists for only the current session, where the "session" begins when the user logs on to a system to access various documents and the session ends when the user logs off. Creation of one ephemeral key for a session is beneficial as it allows the encryption module 210 to efficiently create and track one ephemeral key for multiple documents accessed during the session.

Additionally, the ephemeral key can also be called the "ephemeral cryptographic session key." In one embodiment, the ephemeral key is asymmetric and, in another embodiment, the ephemeral key is symmetric. The encryption key encrypted with the ephemeral key is also referred to as the "ephemeral encrypted encryption key."

The encryption module 210 writes the ephemeral encrypted encryption key to the storage device 110. In one embodiment, the encryption module 210 writes the ephemeral encrypted encryption key to the header of the encrypted file on the storage device 110. Other embodiments write the ephemeral encrypted encryption key to other locations on the storage device 110.

The policy module 220 examines the data written to the storage device 210 for compliance with a DLP policy. In one embodiment, the policy module 220 retrieves a DLP policy from the policy server 106. In the event that there are multiple DLP policies, the policy module 220 can select among these policies using one or more DLP criteria such as the identity of the user using the client 102, the client itself, and/or the document to which the policy is to be applied. For example, if the user using the client 102 to copy a document from the repository 108 to the storage device 110 is in the enterprise's marketing department, the policy module 220 can retrieve a DLP policy specific to the marketing department.

As mentioned above, the DLP policy generally describes the types of data that can and cannot leave the enterprise, and may also specify the circumstances in which the data can leave the enterprise. To this end, the policy module 220 examines the file data on the storage device 110 for compliance with the policy. For example, the policy module 220 can scan the document for certain terms and if those terms are present in the document, the policy module 220 can determine that the data are not allowed to be stored to the storage device 110 or that the data can be stored, but access to the data must be restricted to only certain authorized users/user groups.

In order to perform this examination, the policy module 220 obtains the ephemeral key from the encryption module 210. The policy module 220 uses the ephemeral key to decrypt the ephemeral encrypted encryption key written to the header of the file on the storage device 110. Then, the policy module 220 uses the encryption key to decrypt the file data. The policy module 220 does not write the decrypted file data to the storage device 110. The decrypted data are either stored in volatile memory associated with the client 102 (e.g., RAM) or written to a secure non-volatile memory other than the storage device 110.

The enforcement module 230 performs an enforcement action on the file stored on the storage device 110 based on the outcome of the examination by the policy module 220. If the DLP policy prohibits the file from being written to the storage device 110, an embodiment of the enforcement module 230 deletes the file from the storage device 110. The enforcement module 230 also deletes the ephemeral encrypted encryption key that was written to the storage device 110 (either when the file is deleted or as part of a separate action). In addition, the enforcement module 230 wipes the ephemeral key from the memory of the client 102 at the end of the user's logon session.

If the DLP policy allows the file to be written to the storage device 110, the enforcement module 230 configures the encryption of the file according to the policy and/or other criteria, such as the decryption capabilities of users who are authorized to view the data in the file. If the DLP policy allows all users to access the data in the file, one embodiment of the enforcement module 230 writes the encryption key to the file header on the storage device 110 in a manner that makes the encryption key publicly-accessible. For example, the enforcement module 230 writes a decrypted encryption key to the file header. Alternatively, the enforcement module 230 encrypts the encryption key with a public key whose corresponding private key is publicly available. Users can thus use the encryption key to decrypt and access the file. Another embodiment of the enforcement module 230 uses the ephemeral key and encryption key to decrypt the file data, and writes the decrypted data to the storage device 110.

If the DLP policy allows users of clients 102 having encryption capabilities to access the data in the file, an embodiment of the enforcement module 230 encrypts the file data on the storage device 110 in a manner that allows authorized users (and user groups) to decrypt the file. To this end, the enforcement module 230 obtains public keys for the authorized users (from, e.g., an enterprise key server), and encrypts the encryption key with the public keys to produce user encrypted encryption keys. The enforcement module 230 stores the user encrypted encryption keys in the header of the file on the storage device 110. The authorized users can then use their corresponding private keys to decrypt the user encrypted encryption keys and use the encryption key to decrypt the file.

In this manner, the DLP module 152 beneficially prevents any unauthorized access to the file data. A sophisticated unauthorized user may still search the storage device 110 for the encrypted file data and the user encrypted encryption keys. However, if not allowed by a policy, the decrypted encryption key itself never existed on the storage device 110. Accordingly, the unauthorized user would not be able to decrypt the encryption key and use the decrypted key to decrypt the file data.

Figure 3:
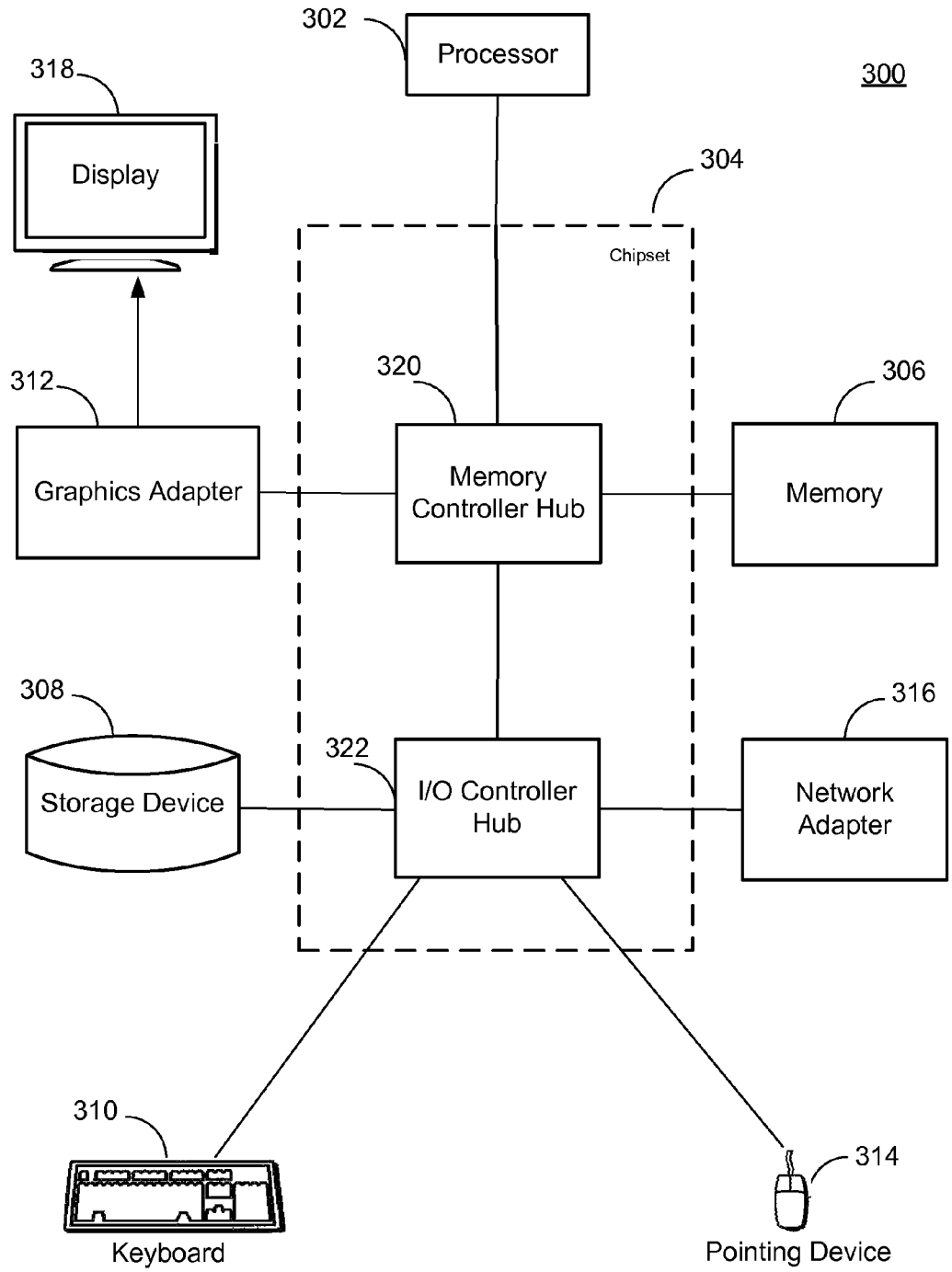
FIG. 3 is a high-level block diagram illustrating an example of a computer for use in the computing environment shown in FIG. 1 according to one embodiment of the present disclosure.

The entities shown in FIG. 1 are implemented using one or more computers. FIG. 3 is a high-level block diagram illustrating an example computer 300. The computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, keyboard 310, pointing device 314, and network adapter 316 are coupled to the I/O controller hub 322. Other embodiments of the computer 300 have different architectures.

The storage device 308 is a non-transitory computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and is used in combination with the keyboard 310 to input data into the computer system 300. The graphics adapter 312 displays images and other information on the display 318. The network adapter 316 couples the computer system 300 to one or more computer networks.

The computer 300 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 308, loaded into the memory 306, and executed by the processor 302.

The types of computers 300 used by the entities of FIG. 1 can vary depending upon the embodiment and the processing power required by the entity. For example, the policy server 106 might comprise multiple blade servers working together to provide the functionality described herein. The computers 300 can lack some of the components described above, such as keyboards 310, graphics adapters 312, and displays 318.

Figure 4A:
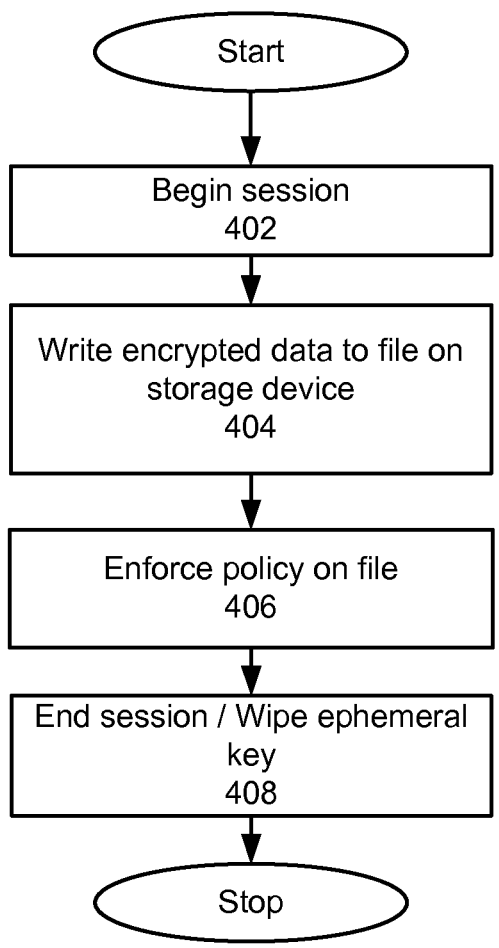
FIG. 4A is a flow diagram illustrating a method for encrypting data according to one embodiment of the present disclosure.

FIG. 4A is a flow diagram illustrating a method for encrypting data according to one embodiment of the present disclosure. A user logs on through client 102 and the DLP module begins 402 a session and creates an ephemeral key for the user's session. Next, the user, through client 102, requests a document stored in the document repository 108 or creates a new document and the DLP module 152 creates an encryption key for the document. The DLP module 152 encrypts 404 the document with the encryption key and writes the encrypted document to a data file on the storage device 110. The DLP module 152 also encrypts 404 the encryption key with the ephemeral key and writes the ephemeral encrypted encryption key to the storage device 110.

The DLP module 152 also identifies a DLP policy associated with the document, user, and/or client 102 and enforces 406 the policy on the file. The enforcement 406 can result in deleting the file or making the file accessible to only certain users. Next, the user may access another document during the session and the DLP module 152 creates another encryption key for the now accessed document and repeats steps 404 and 406 for the document. Eventually, the user logs off, and the DLP module 152 ends 408 the current session and wipes the ephemeral key.

Figure 4B:
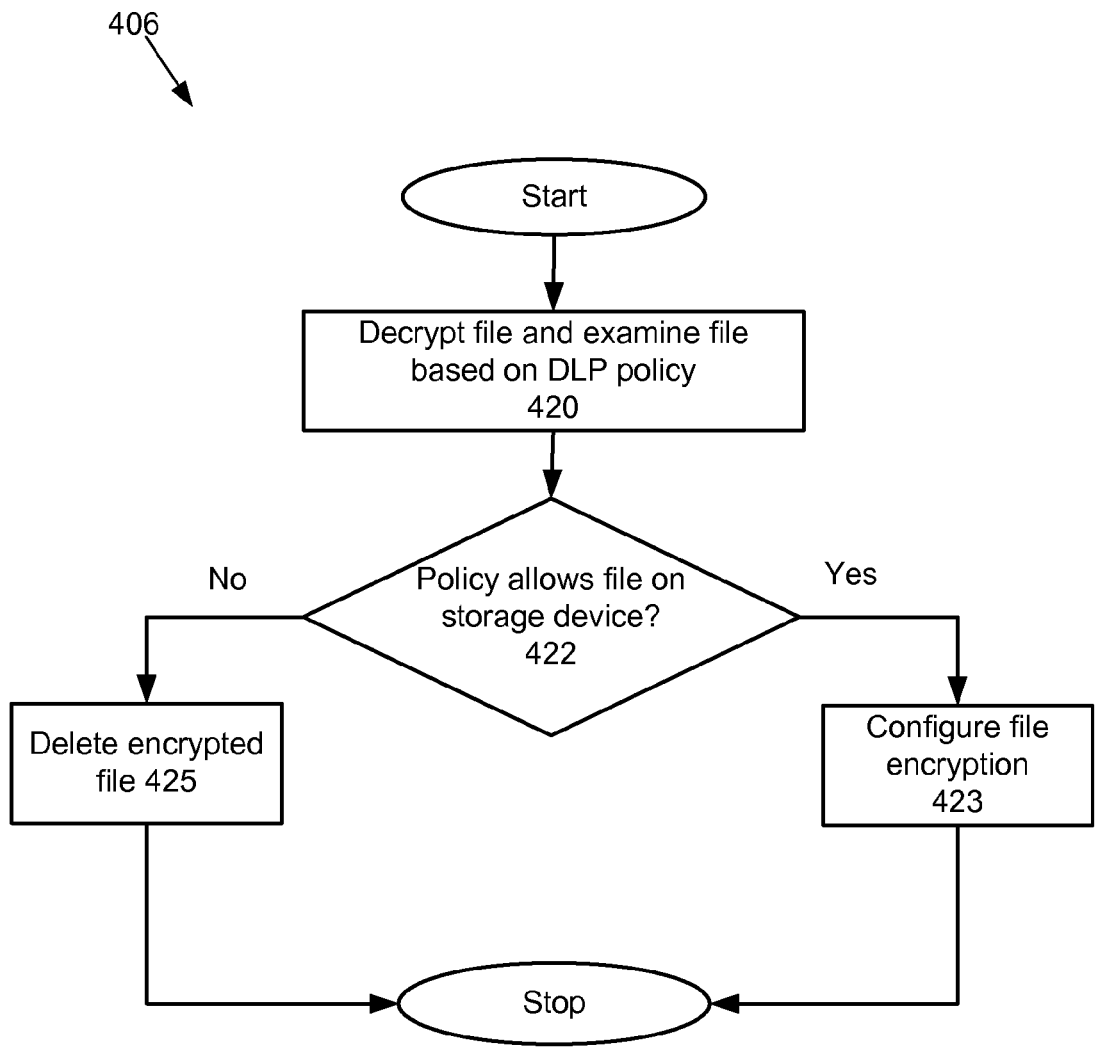
FIG. 4B is a flow diagram illustrating a method for enforcing the DLP policy on an encrypted file according to one embodiment of the present disclosure.

FIG. 4B is a flow diagram illustrating a method for enforcing the DLP policy on an encrypted file stored on the storage device 110 according to one embodiment of the present disclosure. To enforce the policy, the DLP module 152 decrypts the encryption key using the ephemeral key. The DLP module 152 then decrypts 420 the file using the encryption key and examines the decrypted data based on the policy. Based on the examination, the DLP module 152 determines 422 if the data are allowed to be written to the storage device 110. If not, the DLP module 152 deletes 425 the encrypted file from the storage device 110.

If 422 the DLP policy allows writing the file to the storage device 110, the DLP module 152 configures 423 the encryption for the file. For example, the DLP module 152 can write the encryption key to the file header on the storage device 110 in a manner that makes the encryption key publicly-accessible, decrypt the file and store a decrypted version of the file on the storage device, store versions of the encryption key encrypted with authorized users' public keys with the file, etc.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the art to most effectively convey the substance of their work to others skilled in the art. An algorithm is here, and generally, conceived to be a self-consistent sequence of steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose computing systems including a processor, memory, non-volatile storage, input device and output device may be used with programs in accordance with the teachings herein, or it may prove convenient to construct more specialized apparatus to perform the required method steps. The required structure for a variety of these systems will appear from the description below. In addition, the system and its operations are not described with reference to any particular programming language. It will be appreciated that a variety of programming languages may be used to implement the system and its operations as described herein.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system may be further divided into logical modules. One of ordinary skill in the art will recognize that a computer or another machine with instructions to implement the functionality of one or more logical modules is not a general purpose computer. Instead, the machine is adapted to implement the functionality of a particular module. Moreover, the machine embodiment of the system physically transforms the electrons representing various parts of a document into electrons representing an encrypted document.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

What is claimed is:

1. A computer-implemented method for enforcing a data loss prevention (DLP) policy comprising:
   intercepting a request to write a file containing unencrypted data to a storage device;
   responsive to intercepting the request, encrypting the unencrypted data of the file using an encryption key to produce encrypted data, and writing an encrypted file containing the encrypted data to the storage device;
   encrypting the encryption key using an ephemeral key to produce an encrypted encryption key;
   storing the encrypted encryption key in the encrypted file on the storage device;
   decrypting the encrypted data in the encrypted file using the encryption key to produce decrypted data;
   examining the decrypted data for compliance with the DLP policy; and
   deleting the encrypted file from the storage device responsive at least in part to the decrypted data not being in compliance with the DLP policy.

2. The method of claim 1, further comprising:
   wiping the ephemeral key from a volatile memory of a client device.

3. The method of claim 1, wherein storing the encrypted encryption key in the encrypted file comprises storing the encrypted encryption key in a header of the file.

4. The method of claim 1, further comprising:
   encrypting the encryption key, to produce a user encrypted encryption key, using a public key of a user authorized by the DLP policy to decrypt the data written to the file of the storage device responsive at least in part to the decrypted data being in compliance with the DLP policy; and
   storing the user encrypted encryption key in association with the file having the encrypted data on the storage device responsive at least in part to the decrypted data being in compliance with the DLP policy.

5. The method of claim 2, further comprising:
   creating the ephemeral key responsive to receiving a request from a user to log in to a system through the client device; and wherein
   wiping the ephemeral key from the volatile memory of the client device further comprises wiping the ephemeral key responsive to receiving a request from the user through the client device to log off the system.

6. The method of claim 1, wherein the decrypted data are not written to the storage device.

7. The method of claim 1, further comprising:
   storing the decrypted data to the storage device responsive at least in part to the decrypted data being in compliance with the DLP policy.

8. A non-transitory computer-readable storage medium storing executable computer program instructions for enforcing a data loss prevention (DLP) policy, the computer program instructions comprising instructions for:
   intercepting a request to write a file containing unencrypted data to a storage device;
   responsive to intercepting the request, encrypting the unencrypted data of the file using an encryption key to produce encrypted data, and writing an encrypted file containing the encrypted data to the storage device;
   encrypting the encryption key using an ephemeral key to produce an encrypted encryption key;
   storing the encrypted encryption key in the encrypted file on the storage device;
   decrypting the encrypted data in the encrypted file using the encryption key to produce decrypted data;
   examining the decrypted data for compliance with the DLP policy; and
   deleting the encrypted file from the storage device responsive at least in part to the decrypted data not being in compliance with the DLP policy.

9. The non-transitory computer-readable storage medium of claim 8, further comprising instructions for:
   wiping the ephemeral key from a volatile memory of a client device.

10. The non-transitory computer-readable storage medium of claim 8, wherein storing the encrypted encryption key in the encrypted file comprises storing the encrypted encryption key in a header of the file.

11. The non-transitory computer-readable storage medium of claim 8, further comprising instructions for:
    encrypting the encryption key, to produce a user encrypted encryption key, using a public key of a user authorized by the DLP policy to decrypt the data written to the file of the storage device responsive at least in part to the decrypted data being in compliance with the DLP policy; and
    storing the user encrypted encryption key in association with the file having the encrypted data on the storage device responsive at least in part to the decrypted data being in compliance with the DLP policy.

12. The non-transitory computer-readable storage medium of claim 9, further comprising instructions for:
    creating the ephemeral key responsive to receiving a request from a user to log in to a system through the client device; and wherein
    wiping the ephemeral key from the volatile memory of the client device further comprises wiping the ephemeral key responsive to receiving a request from the user through the client device to log off the system.

13. The non-transitory computer-readable storage medium of claim 8, wherein the decrypted data are not written to the storage device.

14. The non-transitory computer-readable storage medium of claim 8, further comprising instructions for:
    storing the decrypted data to the storage device responsive at least in part to the decrypted data being in compliance with the DLP policy.

15. A computer system for enforcing a data loss prevention (DLP) policy, the computer system comprising:

a computer processor for executing computer program instructions;

a non-transitory computer-readable medium storing executable computer program instructions comprising instructions for:

intercepting a request to write a file containing unencrypted data to a storage device;

responsive to intercepting the request, encrypting the unencrypted data of the file using an encryption key to produce encrypted data, and writing an encrypted file containing the encrypted data to the storage device;

encrypting the encryption key using an ephemeral key to produce an encrypted encryption key;

storing the encrypted encryption key in the encrypted file on the storage device;

decrypting the encrypted data in the encrypted file using the encryption key to produce decrypted data;

examining the decrypted data for compliance with the DLP policy; and deleting the encrypted file from the storage device responsive at least in part to the decrypted data not being in compliance with the DLP policy.

16. The computer system of claim 15, further comprising instructions for:

wiping the ephemeral key from a volatile memory of a client device.

17. The computer system of claim 15, wherein storing the encrypted encryption key in the encrypted file comprises storing the encrypted encryption key in a header of the file.

18. The computer system of claim 15, further comprising instructions for:

encrypting the encryption key, to produce a user encrypted encryption key, using a public key of a user authorized by the DLP policy to decrypt the data written to the file of the storage device responsive at least in part to the decrypted data being in compliance with the DLP policy; and storing the user encrypted encryption key in association with the file having the encrypted data on the storage device responsive at least in part to the decrypted data being in compliance with the DLP policy.

19. The computer system of claim 15, wherein the decrypted data are not written to the storage device.

20. The computer system of claim 15, further comprising instructions for:

storing the decrypted data to the storage device responsive at least in part to the decrypted data being in compliance with the DLP policy.

\* \* \* \* \*